United States Patent Office 3,423,936
Patented Jan. 28, 1969

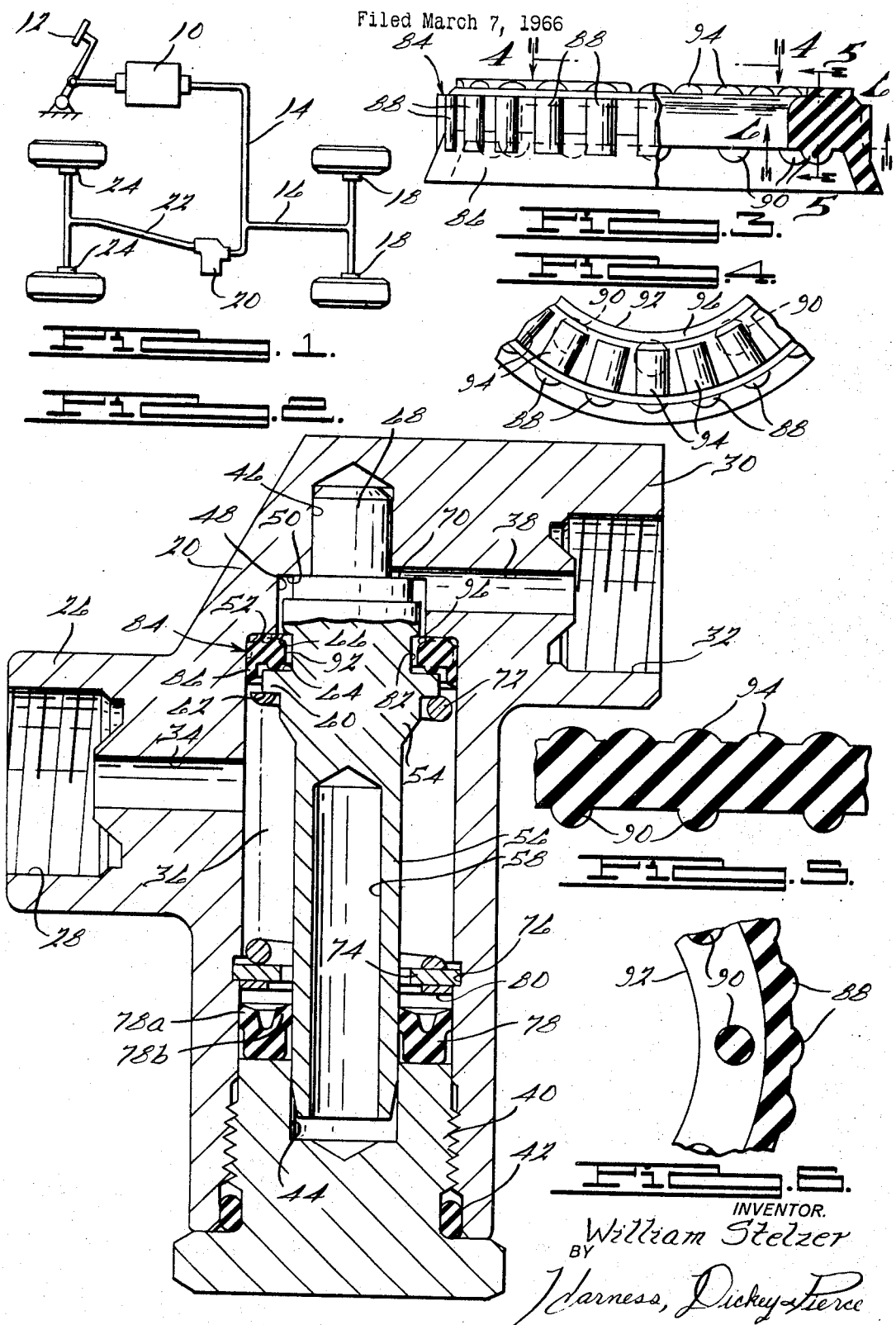

3,423,936
PRESSURE PROPORTIONING VALVE
William Stelzer, Bloomfield Hills, Mich., assignor to Kelsey-Hayes Company, Romulus, Mich., a corporation of Delaware
Filed Mar. 7, 1966, Ser. No. 532,471
U.S. Cl. 60—54.5                           10 Claims
Int. Cl. F15b 7/06; F16k 31/363

ABSTRACT OF THE DISCLOSURE

A pressure proportioning valve adapted to be interposed between the master cylinder and the rear wheel brake cylinders of an automobile for the purpose of limiting pressurization of the rear brakes relative to the front brakes during higher ranges of applied master cylinder pressure. An annular rubber valve seat member surrounds a piston-like valve element and is proportioned to permit a valve head portion of the valve element to slide within it during a reduction in brake pressure from a high level to maintain the same relative pressurization of the brakes as occurred upon the increase in brake pressure. Various spaced projections are formed on the valve seat member to permit the desired flow of fluid in the operation of the brakes at lowered pressures. The valve element is also arranged to return brake fluid to the system in the event of any leakage past the seal for the valve element.

---

This invention relates to vehicular hydraulic brake systems and particularly to a brake pressure proportioning valve adapted to modulate the fluid pressure at one or more brake cylinders with respect to the fluid pressure generated by a fluid motor.

The device of the present invention is adapted to reduce the relative pressurization of the rear brakes of a motor vehicle with respect to the pressurization of the front brakes in the higher ranges of applied brake pressure. This is desirable in view of the fact that a portion of the weight borne by the rear wheels of the vehicle is transferred to the front wheels of the vehicle during rapid deceleration. As a result of this weight transfer, the maximum braking effort of which rear wheels are capable is reduced and the maximum braking effort of the front wheels is increased. It is therefore desirable to deliver a higher level of fluid pressure to the front wheels than to the rear wheels during the high rates of deceleration. This will avoid premature rear wheel skidding, help maintain the vehicle under control and reduce the total distance required to stop the vehicle.

The front and rear brake cylinders of a vehicle are ordinarily sized to apply forces to the front and rear brakes which are of the desired ratio for light braking or ordinary stopping. During extremely rapid deceleration or panic brake applications, However, the "built-in" ratio is no longer satisfactory and the ratio should be changed for maximum braking efficiency. The greater the rate of deceleration the greater should be the ratio of front brake pressure to rear brake pressure. While a bare measurement of the applied brake pressure is not a completed accurate index of the rate of deceleration of the vehicle, it has been found to be a practical guide which may be usefully employed in determining the point at which the relative pressurization of the front and rear brake cylinders should be altered. The device of the present invention makes use of the applied brake pressure for such purpose.

While I have heretofore proposed a variety of different pressure proportioning valves for hydraulic brake systems, the device illustrated herein is particularly distinguished by its simplicity of construction and its low cost of manufacture. It is, accordingly, an object of the present invention to provide a proportioning valve of the above character which may be manufactured at a relatively low cost, which is of relatively simple construction, which is reliable in use, and which lends itself to miniaturization.

It is another object of the present invention to provide a proportioning valve which avoids any drynamic seals exposed to atmosphere and which is operable to return to the brake system brake fluid which leaks past any dynamic seals.

It is a further object of the present invention to provide a proportioning valve incorporating a novel elastomeric valve member which holds itself in place, which is normally effective to permit the transmission of the fluid pressure in a desired manner, which is operable to prevent the transmission of fluid pressure when engaged by a pressure-responsive valve element and which will prevent the excessive pressurization of the rear brakes by functioning as a check valve.

Other objects and advantages of the invention will become apparent from the following detailed description taken in conjunction with the accompanying drawings wherein:

FIGURE 1 is a schematic view of a brake system having the device of the present invention incorporated therein;

FIGURE 2 is an enlarged vertical sectional view of the device of the present invention as shown in FIGURE 1;

FIGURE 3 is an enlarged view partly in section and partly in elevation of one of the parts of the structure illustarted in FIGURE 2;

FIGURE 4 is a sectional view of the structure illustrated in FIGURE 3 taken along the line 4—4; and FIGURES 5 and 6 are enlarged sectional views of the structure illustrated in FIGURE 3 taken along the lines 5—5 and 6—6 thereof, respectively.

The proportioning valve of the present invention is adapted for interposition in a standard vehicle braking system as diagrammatically illustrated in FIGURE 1. This braking system will be seen to include a fluid motor in the form of a standard master cylinder 10 which is operated by a brake pedal 12 to deliver brake fluid under pressure through a conduit 14. The conduit 14 is connected on one end to a conduit 16, leading to a pair of front brake cylinders 18 and also leading to a housing 20. The housing 20 forms a part of the device of the present invention and encloses the remaining parts thereof. Fluid under pressure is normally transmitted directly through the housing 20 to a conduit 22 leading to a pairof rear brake cylinders 24. It will thus be apparent that the delivery of brake fluid to the front brake cylinder 18 is accomplished directly from the master cylinder 10, while the device of the present invention is interposed in the path between the master cylinder 10 and the rear brake cylinders 24 either to transmit master cylinder pressure directly to the rear brake cylinders 24 or to modify the pressure delivered to the rear brake cylinders 24 relative to front brake cylinder pressure.

The housing 20 has an inlet boss 26 provided with a threaded inlet opening 28 arranged to receive brake fluid from the conduit 16, and an outlet boss 30 having a threaded outlet opening 32 adapted to communicate brake fluid to the conduit 22. A passage 34 is formed in the housing leading from the inlet opening 28 to a central bore shaped chamber 36. The passage 34 communicates with the chamber 36 generally at its midlength, while a passage 38 will be seen to extend from the upper end of the chamber 36 to the outlet opening 32. The chamber 36 is conveniently formed by drilling and/or boring the housing 20 from its lower end. The lower end of the chamber 36 is closed by a cap or closure member 40 and an O-ring or seal 42 is fitted between the cap 40 and the housing 20 to prevent the leakage of fluid out of the housing 20 past the cap 40. It will be seen that the cap 40 has a central blind bore 44 at its upper end facing toward the chamber 36 and disposed coaxially therewith. The housing 20 also has a blind bore 46 at its upper end disposed in axial alignment with the bore 44. Both of the bores 44 and 46 are of a lesser diameter than the chamber 36 and face toward the chamber 36 from its opposite ends. The chamber 36 has a reduced diameter portion 48 at its upper end adjacent to the bore 46. It will be seen that an annular shoulder 50 is formed on the housing 20 between the bore portion 48 and the bore 46 and that an annular shoulder 52 is formed on the housing 20 between the main portion of the chamber 36 and the reduced diameter portion 48 thereof.

The blind bores 44 and 46 serve to slidably support and guide a pressure responsive valve element or piston 54. The pressure responsive element 54 has an elongated hollow cylindrical portion 56 piloted in the bore 44. The cylindrical portion 56 is provided with an elongated central blind opening or cavity 58 which is open at its lower end to the bore 44. The valve element 54 has a radially extending annular flange 60 provided with a radially extending annular shoulder 62 on one side thereof and a radially extending annular shoulder 64 on its other side. Disposed above the flange 60 on the valve element 54 is a valve head or shoulder 66 which is of generally rounded annular configuration. Disposed at the uppermost end of the element 54 is a projection 68 which is slidably fitted in the blind bore 46.

The pressure responsive valve element 54 is biased upwardly so that a shoulder 70, disposed adjacent the upper end thereof just below the projection 68, abuts the shoulder 50 of the housing 20. This is accomplished by means of a spring 72 which engages the shoulder 62 at its upper end and is seated against a snap ring 74 at its lower end. The snap ring 74 is of the usual split type which may be compressed so as to be fitted in an annular groove 76 machined in the wall of the chamber 36. Disposed beneath the ring 74 and immediately above the cap 40 is a cup-type seal 78. A metal washer 80 is positioned between the seal 78 and the ring 74 to prevent possible damage to the seal 78 by the split in the ring 74. The seal 78 is arranged so that a flange 78a thereof engages the wall of the chamber 36 and another flange 78b engages the outer periphery of the tubular portion 56 of the pressure responsive element 54. When subjected to a high pressure from within the chamber 36, the seal member 78 functions to prevent the downward movement of fluid therepast as a result of its flanges 78a and 78b being biased radially outwardly and inwardly, respectively. However, should any brake fluid leak past the seal 78, to the bore 44 or cavity 58, it will be able to flow back past the seal 78 to the chamber 36 in a manner which will be subsequently explained.

The pressure responsive element 54 has a reduced diameter cylindrical portion 82 interposed between the shoulder 64 and the valve head 66 thereof. Spacedly surrounding the portion 82 is an elastomeric annular valve member 84. The valve member 84 is engageable with the shoulder 52, the wall of the chamber 36, and the annular shoulder 64. The valve head 66 functions either to permit the transmission of fluid pressure from the chamber 36 to the outlet opening 32, or to close this fluid path and modulate the pressure at the outlet opening 32 with respect to the pressure at the inlet opening 28. This is accomplished by the vertical movement of the pressure responsive element 54 in response to the various fluid pressures acting on it.

The details of construction of the valve member 84 are shown in FIGS. 3–6. It will be seen that the valve member 84 has a depending lip 86 which, in the free state of the valve member 84, is inclined angularly downwardly and radially outwardly. When the valve member 84 is fitted in the chamber 36, its lip 86 is deflected radially inwardly slightly by the engagement of its outer perihpery with the wall of the chamber 36. This prevents the upward flow of fluid from the chamber 36 around the lip 86. The outer periphery of the valve member 84, above the lip 86, is provided with a plurality of circumferentially spaced axially extending ribs 88 of generally semicylindrical shape. The ribs 88 contact the wall of the chamber 36 above the lip 86. The flange 60 of the valve element 54 lies partly within the lip 86, and its shoulder 64 engages a plurality of spaced semispherical bosses 90 projecting downwardly from the lower side of the valve member 84. The outer diameter of the flange 60 is less than the inner diameter of the lip 86, thus permitting fluid to flow from the chamber 36 through the spaces between the bosses 90. Also, the diameter of the cylindrical portion 82 of the valve element 54 is less than the diameter of an inner peripheral surface 92 of the valve member 84 adjacent thereto so that an open fluid path exists from the space between the bosses 90 to the passage 38 with the element 54 disposed in the position illustrated in the drawing.

The upper end of the valve member 84 is provided with a plurality of angularly spaced ribs 94 engageable with the shoulder 52 and angularly aligned with the ribs 88 to provide spaces therebetween for the flow of fluid from the passage 38 out between the shoulder 52 and the valve member 84, to the spaces between the ribs 88 formed on the outer periphery of the valve member 84. By this means, fluid pressure at the outlet opening 32 can gain access to the outer periphery of the lip 86 so that if fluid pressure at the outlet opening 32 is higher than fluid pressure at the inlet opening 28 after valve closure, the outlet pressure can force the lip 86 radially inwardly for the reverse flow of fluid from the outlet opening 32 to the chamber 36 around the valve member 84. It will be seen that the valve member 84 has a rounded valve seat 96 disposed at the upper end of its inner peripheral surface 92. The seat 96 is engageable with the valve head or shoulder 66 of the pressure responsive valve element 54 upon downward movement of the element 54 against the spring 72.

The operation of the valve in providing a path for the direct transmission of pressure from the inlet opening 28 to the outlet opening 32 has already been described. This path remains open until the fluid pressure delivered to the housing 20 by the master cylinder 10 attains a predetermined level. At this time the valve head 66 will close against the valve member seat 96. The level of pressure at which this occurs is dependent upon the force of the spring 72 compared to the effective area of the valve element 54, acted upon by inlet fluid presure in a direction opposing the force of the spring 72. This effective area is equal to the diameter of the cylindrical portion 56 of the valve element 54, inasmuch as the lower end of the cylindrical portion 56 is sealed off from the inlet fluid pressure by the seal 78 while fluid pressure acts against all of the remaining portions of the valve element 54, including the projection 68. During the lower ranges of applied brake effort the pressure acting on this effective area produces a downward force which is insufficient to overcome the force of the spring 72. Assuming that $P_1$ equals the inlet fluid pressure, A equals the cross-sectional area of the cylindrical portion 56, and S equals the force of the spring 72, then the valve element 54 will close when $P_1 A > S$.

After the valve head 66 closes against the valve member 84 and the fluid pressure at the inlet opening 28 is further increased by the master cylinder 18, the increased level of fluid pressure will act against the valve element 54 over an effective circular area having a diameter equal to the mean sealing diameter of the valve head 66 (hereafter called B) less the area A. This produces an upward force on the valve element 54 assisting the spring 72 and tending to reopen the valve element 54 to deliver at least a portion of this increased fluid pressure to the outlet. It will be noted, however, that any of this increased fluid pressure delivered to the outlet 32 creates an opposing downward force on the valve element 54 acting downwardly on the valve element 54 over the area B. This, of course, tends to reclose the valve element 54 against the valve member 84. These opposing forces tend to keep the valve head 66 closely adjacent to the valve member seat 96 for the restricted flow of fluid from the inlet opening 28 to the outlet opening 32 to create a pressure at the outlet opening 32 which increases at a lower rate than the pressure at the inlet opening 28. The ratio of the pressures is determinetd by the relationship of the effective areas previously referred to. After the valve first closes the increase in pressure at the inlet opening 28 (hereafter called $\Delta P_1$) will produce an increase in pressure at the outlet opening (hereinafter called $\Delta P_2$) in accordance with the following formula:

$$\Delta P_1 \left( \frac{B-A}{B} \right) = \Delta P_2$$

Similarly, if we assume $P_2$ is the pressure at the outlet, the $P_2B = P_1(B-A) + S$ after the valve element 54 becomes operative. Accordingly, the fluid pressure existing in the front brake cylinders 18 will be greater than the fluid pressure in the rear brake cylinders 24 when the brakes are applied with a force greater than necessary to move the valve element 54 against the spring 72.

During that portion of a brake application in which the applied pedal effort is reduced subsequent to a brake application of sufficient intensity to have moved the valve element 54 to the restricted flow position, $P_1$ acting on $B-A/B$ is reduced. Thus, the forces tending to move the valve element 54 upwardly are reduced and the valve element 54 moves downwardly under the influence of the pressure at the outlet opening ($P_2$) acting on B. As the valve element 54 moves downwardly, its head 66 slides within the inner peripheral surface 92 of the valve member 84, thereby increasing the available volume for the fluid at the rear brake cylinders 24 and thereby accomplishing a reduction in $P_2$. The valve element will continue its downward movement in an effort to reduce $P_2$ to satisfy the previously mentioned formula:

$$P_2B = P_1(B-A) + S$$

However, the valve element 54 may not completely achieve this result because of the limited possible downward travel thereof. However, during the descent in brake pressure, the presure at the outlet opening 32 can never be greater than the pressure at the inlet opening 28. This is because the fluid at the outlet opening 32 is able to flow downwardly around the valve member 84 between the lip 86 and the wall of the chamber 36 if the fluid presure in the chamber 36 is at a lower level. The valve member 84 accordingly functions as a check valve to prevent rear brake pressure from ever being greater than front or master cylinder pressure.

It should be noted that only a very slight downward movement of the valve element 54 is necessary in order to relieve the pressure at the rear brake cylinders 24. Even if the cylindrical portion 56 abuts the bottom wall of the bore 44, however, the presure produced at the outlet opening 32 will be close enough to the desired pressure during the reduction in brake pressure to be acceptable. When the pressure at the inlet opening 28 descends beneath the level at which the valve originally closed, the valve element 54 will be moved upwardly by the spring 72 to reopen the annular passage between the valve head 66 and the valve member seat 96.

The device of the present invention is intended to be positioned on the vehicle in the attitude illustrated in FIGURE 2, that is, with the cylindrical portion 56 of the valve element 54 extending downwardly. It will be apparent that any seal which has a movable part in contact with it (that is, a "dynamic seal") is subject to wear. If the seal 78 does become worn and fluid leaks downwardly past it during a brake application, this fluid will accumulate at the bottom of the bore 44 and, in so doing, it will compress the air which normally occupies the cavity 58 and the bore 44. When the pressure from the master cylinder is released, the air which was compressed by the leaking brake fluid will attempt to expand and force the leaked brake fluid upwardly back into the chamber 36. Such a flow of fluid is permitted by the fact that the seal 78 is unidirectionally acting and fluid can readily flow upwardly between the flange 78b and the outer periphery of the tubular portion 56 by the radially outward deflection of the flange 78b. It will be seen that the seal 78 is formed with an annular groove between the flanges 78a and 78b which readily permits the radially outward deflection of the flange 78b. The seal 78 is the only dynamic seal in the system and the device of the present invention is substantially "fail safe" by virtue of the fact that any fluid leaking past this one dynamic seal is not exhausted to atmosphere but is automatically returned to the system. While the compression of the air within the cavity 58 may not be sufficient to return all of the leaked brake fluid to the chamber 36, it will return most of such fluid and the maximum amount of the possible leakage past the seal 78 is minimal.

It can be seen that in the normal positions of the parts as illustrated in FIGURE 2, the flange 60 of the valve element 54 keeps the valve member 84 in position. After valve closure, the valve member 84 is held in its position by the slight frictional engagement it has with the wall of the chamber 36 by the differential fluid pressures acting upon it, and by the flow of fluid thereby. Accordingly, it is unnecessary to provide any special means for holding the valve member 84 in position.

It will be noted that the expressions "valve element," "valve member," "valve head," and "valve seat," have been used to refer to certain of the valve parts and portions or surfaces thereof. Several of such expressions are usable interchangeably with equal propriety. For example, the expressions "valve element" and "valve member" are intended to refer to any part used to open or close a passage, irrespective of whether such part is movable or stationary, whether such part more nearly resembles a seal or some part having another common name or whether such part also performs some other function, such as the function of a piston. Also, the expressions "valve head" and "valve seat" are used in the broadest sense and refer to any portion or surface of a valve member or element which cooperates with another surface or portion for blocking or restricting the flow of fluid therebetween.

While the preferred form of the invention illustrated herein is well calculated to fulfill the objects above stated, it will be apparent that the invention is susceptible to modification, variation and change without departing from the fair meaning or scope of the ensuing claims.

What is claimed is:

1. A pressure proportioning valve for hydraulic brake systems adapted to be interposed between a fluid motor and at least one brake cylinder including a housing having an inlet, an outlet, and a chamber providing communication between said inlet and said outlet, a pressure responsive member disposed in said chamber and having a valve head, an annular valve member having a radially inwardly facing elastomeric inner peripheral surface spacedly surrounding a radially confronting portion of said pressure responsive member, said valve head being cooperable with said valve member for restricting the flow of fluid from said inlet to said outlet through said valve member during a predetermined range of increasing fluid pressure at said outlet, said valve head being slidably and sealingly engageable within said inner peripheral surface to relieve pressure at said outlet upon a subsequent reduction in fluid pressure at said inlet within said range.

2. The structure set forth in claim 1 in which said valve member comprises a unitary elastomeric molding having a plurality of circumferentially spaced projections on one side thereof and including a shoulder on said pressure responsive member, means normally holding said shoulder against said projections, said projections providing spaces therebetween for the free flow of fluid from said chamber to said outlet, said shoulder being moveable away from said projections when said pressure responsive member moves to effect flow restricting operation of said valve head.

3. The structure set forth in claim 1 in which said valve member comprises a unitary elastomeric molding having a flexible lip engaging the wall of said chamber and extending toward said inlet whereby a higher fluid pressure at said inlet than said outlet will bias said lip against said chamber wall and a higher fluid pressure at said outlet than at said inlet will bias said lip radially inwardly for the flow of fluid from said outlet to said inlet between said lip and said chamber wall.

4. A pressure proportioning valve for hydraulic brake systems adapted to be interposed between a fluid motor and at least one brake cylinder including a housing having an inlet, an outlet, and a chamber providing communication between said inlet and outlet, a pressure responsive member disposed in said chamber and having a valve head, means in said chamber defining a fixed abutment surface, an annular valve member engageable with said abutment surface, a shoulder formed on said pressure responsive member engageable with said valve member, a spring operable to bias said pressure responsive member so that its said shoulder is held against said valve member and said valve member is held against said abutment, means providing an opening for the flow of fluid between said valve member and said shoulder when said shoulder is held against said valve member, said pressure responsive member being movable against the force of said spring at a predetermined level of pressure in said chamber to a position in which said valve head cooperates with said valve member to restrict the flow of fluid from said chamber to said outlet.

5. The structure set forth in claim 4 in which said valve member comprises a unitary elastomeric molding having a plurality of projections engageable with said abutment, said abutment engaging projections providing spaces for the flow of fluid from said outlet to the outer periphery of said valve member and including a lip formed on the outer periphery of said valve member extending away from said outlet and engaging the wall of said chamber, whereby fluid pressure at said outlet is operable to bias said lip radially inwardly and flow thereby when it is at a greater level than the pressure at said inlet.

6. A pressure proportioning valve for hydraulic brake systems adapted to be interposed between a fluid motor and at least one brake cylinder including a housing having an inlet, an outlet and a chamber providing communication between said inlet and said outlet, a pressure responsive member in said chamber having a valve head and a cylindrical portion having its axis extending in the direction of movement thereof, means defining a valve seat cooperate with said valve head for restricting the flow of fluid from said chamber to said outlet, a spring normally biasing said pressure responsive member to a position in which fluid is permitted to flow freely from said chamber to said outlet, a unidirectional acting seal engaging the outer periphery of said cylindrical portion and operable to seal one end of said pressure responsive member from fluid pressure in said chamber, means defining a cavity which is sealed to the atmosphere and is operable to collect fluid leaked past said seal from said chamber during a brake application, said cavity being normally occupied by air whereby fluid leaked past said seal during a brake application will compress the air in said cavity and said compressed air will expand to return at least a portion of said leaked fluid to said chamber upon a reduction of fluid pressure in said chamber.

7. The structure set forth in claim 6 in which said cylindrical portion has an opening open to said cavity and contains air adapted to be pressurized by brake fluid leaked to said cavity.

8. The structure set forth in claim 6 in which said seal has an annular elastomeric lip at its inner periphery engageable with the outer periphery of said cylindrical portion, said lip being biased against said cylindrical portion by a higher pressure in said chamber and being biased radially outwardly by a higher pressure in said reservoir.

9. The structure set forth in claim 6 in which said cylindrical portion has its axis disposed in a vertical attitude and in which said cylindrical portion extends downwardly with respect to said valve head.

10. The structure set forth in claim 6 including a closure member at one end of said housing having a blind bore operable to receive one end of said cylindrical portion and in which said cylindrical portion has a bore exposed to said blind bore and whereby said bore and said blind bore comprise said cavity.

References Cited
UNITED STATES PATENTS

| | | | |
|---|---|---|---|
| 2,991,797 | 7/1961 | Baldwin | 137—493 |
| 3,315,469 | 4/1967 | Stelzer | 303—6 |

M. CARY NELSON, *Primary Examiner.*

ROBERT J. MILLER, *Assistant Examiner.*

U.S. Cl. X.R.

137—505